United States Patent
Kaaresoja

(10) Patent No.: US 7,050,439 B1
(45) Date of Patent: May 23, 2006

(54) METHOD FOR PERFORMING DISCONTINUOUS TRANSMISSION IN AN ASYNCHRONOUS TRANSFER MODE

(75) Inventor: Topi Kaaresoja, Helsinki (FI)

(73) Assignee: Nokia Networks Oy, Nokia Group (FI)

( * ) Notice: Subject to any disclaimer, the term of this patent is extended or adjusted under 35 U.S.C. 154(b) by 1215 days.

(21) Appl. No.: 09/607,072

(22) Filed: Jun. 29, 2000

Related U.S. Application Data

(63) Continuation of application No. PCT/EP97/07324, filed on Dec. 31, 1997.

(51) Int. Cl.
*H04L 12/56* (2006.01)

(52) U.S. Cl. .................. 370/395.1; 370/506; 370/310.1
(58) Field of Classification Search .............. 370/395.1, 370/310, 310.1, 328, 337, 338, 347, 349, 370/350, 329, 333, 335, 336, 345, 503, 506, 370/509; 455/422.1, 501, 63.1
See application file for complete search history.

(56) References Cited

U.S. PATENT DOCUMENTS

| | | | | |
|---|---|---|---|---|
| 5,835,486 A | * | 11/1998 | Davis et al. | 370/287 |
| 5,953,666 A | * | 9/1999 | Lehtimaki | 455/439 |
| 5,991,716 A | * | 11/1999 | Lehtimaki | 704/212 |
| 6,035,179 A | * | 3/2000 | Virtanen | 455/63.1 |
| 6,108,560 A | * | 8/2000 | Navaro et al. | 455/517 |
| 6,138,022 A | * | 10/2000 | Strawczynski et al. | 455/422.1 |
| 6,308,063 B1 | * | 10/2001 | Koistinen et al. | 455/422.1 |

FOREIGN PATENT DOCUMENTS

| | | |
|---|---|---|
| EP | 0 756 267 | 1/1997 |
| EP | 0 810 757 | 12/1997 |
| EP | 0 810 804 | 12/1997 |

OTHER PUBLICATIONS

International Search Report for PCT/EP97/07324.
Tommi Koistinen, Nokia Telecommunications: "Spesification", Version .02 (Mar. 4, 1997).
ETSI/GSM: "Comfort Noise Aspects for Full–Rate Speech Traffic Channels" (Feb. 1992).
ETSI/GSM: "Voice Acitivity Detection" (Feb. 1992).
ETSI/GSM: "Inband Control of Remote Transcoders and Rate Adaptors" (Feb. 1992).

* cited by examiner

*Primary Examiner*—Brian Nguyen
(74) *Attorney, Agent, or Firm*—Squire, Sanders & Dempsey LLP

(57) ABSTRACT

A method for performing discontinuous transmission in an asynchronous transfer mode is described, wherein a downlink transmission of an ATM cell is performed each time a predetermined number of signal frames indicating a speechless period has been supplied, and wherein an uplink transmission of an ATM cell is only performed when a signal frame indicating a useful information has been supplied. In the downlink transmission, an idle frame can be generated at the receiving end, when no ATM cell is received. In the uplink transmission, a signal frame indicating a useless information can be generated, when no ATM cell is received. Thereby, only those signal frames required at the receiving end are transmitted. Moreover, known transmission functions and elements of a synchronous transmission system can be used at the respective ends of transmission.

11 Claims, 6 Drawing Sheets

METHOD FOR PERFORMING DISCONTINUOUS TRANSMISSION IN AN ASYNCHRONOUS TRANSFER MODE

This application is a continuation of international application serial number PCT/EP97/07324, filed 31 Dec. 1997.

FIELD OF THE INVENTION

The present invention relates to a method for performing discontinuous transmission in an asynchronous transfer mode (ATM), and particularly to a Discontinuous Transmission (DTX) for full-rate speech traffic channels in an ATM based GSM BSS network using GSM network elements.

BACKGROUND OF THE INVENTION

In a GSM network, signal transmission is performed between a mobile station (MS) and a Base Station Subsystem (BSS) comprising a Transcoder (TC) for encoding/decoding transmitted information and a Base Transceiver Station (BTS) for receiving/transmitting radio signals from/to the MS within a predetermined cell. Typically, the BTS and the TC are wire-connected using a synchronous PCM (Pulse Code Modulation) connection.

In a discontinuous transmission (DTX) mode, transmission is automatically interrupted in a speechless period to thereby reduce power consumption and interference of neighbouring cells.

During such speechless periods, Silence Descriptor frames (SID frames) comprising background noise information are transmitted. Thus, a receiver may bridge speechless periods by generating a noise signal (comfort noise) adapted to the background noise. In the GSM TDMA (Time Divisional Multiple Access) system, these SID frames are transmitted at reduced intervals (eg. every 480 ms) as compared to the usual GSM frame period during speech periods (4.615 ms in an air interface and 20 ms in the BSS).

A known DTX method of the synchronous PCM connection is described in the following.

According to the GSM system, a full rate speech frame (TRAU frame) consists of 40 octets (0–39) of 8 bit length, comprising speech parameter and flag information. Additionally, two octets of PCM synchronization information are provided at the beginning of the frame. The flag information of the TRAU frame comprises the following flags:

| FLAG | BIT | FRAME POSITION | MEANING |
|---|---|---|---|
| SID (LSB) | C14 | bit 7, octet 3 | silence descriptor flag |
| SID (MSB) | C13 | bit 6, octet 3 | (two bit information) |
| BFI | C12 | bit 5, octet 3 | bad frame indication flag |
| SP | C16 | bit 7, octet 38 | speech flag |
| TAF | C15 | bit 8, octet 3 | time alignment flag |
| DTX | C17 | bit 8, octet 38 | discontinuous transmission flag |

The SID, BFI and TAF flag only exist in an uplink TRAU frame and the SP flag only in a downlink TRAU frame, whereas the DTX flag exists in both TRAU frame types.

In the downlink direction, i.e. from the TC to the BTS, the TC sets a speech flag (SP flag) in the TRAU frame to thereby indicate whether the TRAU frame contains speech or not. In case of speech, the SP flag is set to "1", otherweise to "0". In the case of SP=0, the TRAU frame contains information used for generating comfort noise. The first TRAU frame containing SP=0 is transmitted to an air interface (radio transmitter) at the BTS and thereafter the transmission is stopped. However, the TC continues transmitting the comfort noise information to the radio transmitter at the BTS which transmits one frame every 480 ms. As soon as SP=1, continuous transmission is again started.

In an uplink direction, i.e. from the BTS to the TC, the BTS uses the BFI flag in the TRAU frame to indicate whether the TRAU frame contains a useful or a useless speech information, wherein BFI=1 indicates the useless speech information. The frame might have been modified during radio transmission such that the received speech parameters are destroyed.

When the TC receives a TRAU frame with BFI=1, the speech parameters of the current TRAU frame are replaced by the speech parameters of the previous TRAU frame. In case of several subsequent TRAU frames with BFI=1, a muting function is activated.

The SID flag of the TRAU frame consists of two bits and is used by the BTS to indicate whether the TRAU frame contains speech or not SID=00b ("b" indicates binary information) indicates that the TRAU frame contains speech information, whereas SID=10b indicates that information for generating comfort noise is contained. SID=01b indicates that the SID frame has been modified and that a previous one needs to be used.

Thus, if, for example, a TRAU frame with BFI=1 is received after a TRAU frame with SID=10b, the comfort noise generation is continued.

The TAF flag indicates whether the TRAU frame is aligned with a multiframe timing of a control channel (eg. SACCH, Slow Associated Control CHannel) to be used for exchanging control and measurement parameters between the MS and the BSS. In practice, during an uplink DTX, TAF=1 is in the same frame as SID=10b, because signaling is transmitted in the same air frame as the silence descriptor.

The DTX flag is assumed to be always set to "1", since discontinuous transmission is always performed in both directions.

In ATM based GSM networks, the TC and the BTS are connected via an asynchronous ATM (Asynchronous Transfer Mode) connection. In an ATM connection, bit streams of binary signals of different channels are divided into unitary ATM cells to be transmitted in a time divisional manner.

SUMMARY OF THE INVENTION

It is an object of the present invention to provide a method for discontinuous transmission over an ATM connection.

This object is achieved by a method for performing discontinuous transmission in an asynchronous transfer mode ATM, comprising the steps of performing a downlink transmission of an ATM cell each times predetermined number of signal frames indicating a speechless period have been supplied, and performing an uplink transmission of an ATM cell only when a signal frame indicating a useful information has been supplied.

According to the above described known system, useless signal frames are replaced by previous ones in an uplink transmission and the comfort noise signal frame is radio transmitted in the downlink direction at a reduced rate.

Since the above solution according to the present invention suggests transmitting only ATM cells containing signal frames required by the known synchronous system, known DTX functions and elements can be used, when a discontinuous transmission is implemented. Thus, implementation costs can be reduced.

An idle speech frame may be generated, when no ATM cell has been received at a receiving end of the downlink transmission.

Furthermore, a frame indicating a useless information preferably can be generated, when no ATM cell has been received at a receiving end of the uplink transmission.

According to a preferred development, the last signal frame received at the receiving end of the downlink transmission and indicating a speechless period is repeated, when the number of ATM cells not received at the receiving end of the downlink transmission corresponds to said predetermined number of signal frames after which an ATM cell is transmitted.

As an example, this can be achieved by a counter which is initialized each time an ATM cell containing a signal frame indicating a speechless period has been received, and which is incremented each time no ATM cell has been received.

Furthermore, a time alignment flag can be set at the receiving end of the uplink transmission, when the number of ATM cells received or missed since the last setting of the time alignment flag corresponds to the predetermined number of signal frames.

As an example, this can be achieved by a counter which is initialized when an ATM cell containing a set time alignment flag is received at the receiving end, and which is incremented each time an ATM cell is received or missed at the receiving end.

By the above additional measures, possible cell losses in the ATM connection are taken into account.

Preferably, said predetermined number is determined on the basis of a discontinuous transmission period during said speechless period.

This provides the advantage that an additional synchronization of the ATM cell period with the discontinuous transmission period is not required.

BRIEF DESCRIPTION OF THE DRAWINGS

In the following, the invention will be described in greater detail on the basis of a preferred embodiment with reference to the accompanying drawings in which.

DESCRIPTION OF THE PREFERRED EMBODIMENT

The following asynchronous DTX functions may be part of a control program provided for a control means or may be implemented as a hardware ATM interface for the BTS and TC of a BSS.

In the present preferred embodiment, the described asynchronous DTX functions take advantage of the DTX functions already implemented in a current TC and BTS connected via a synchronous connection.

Figure 1:
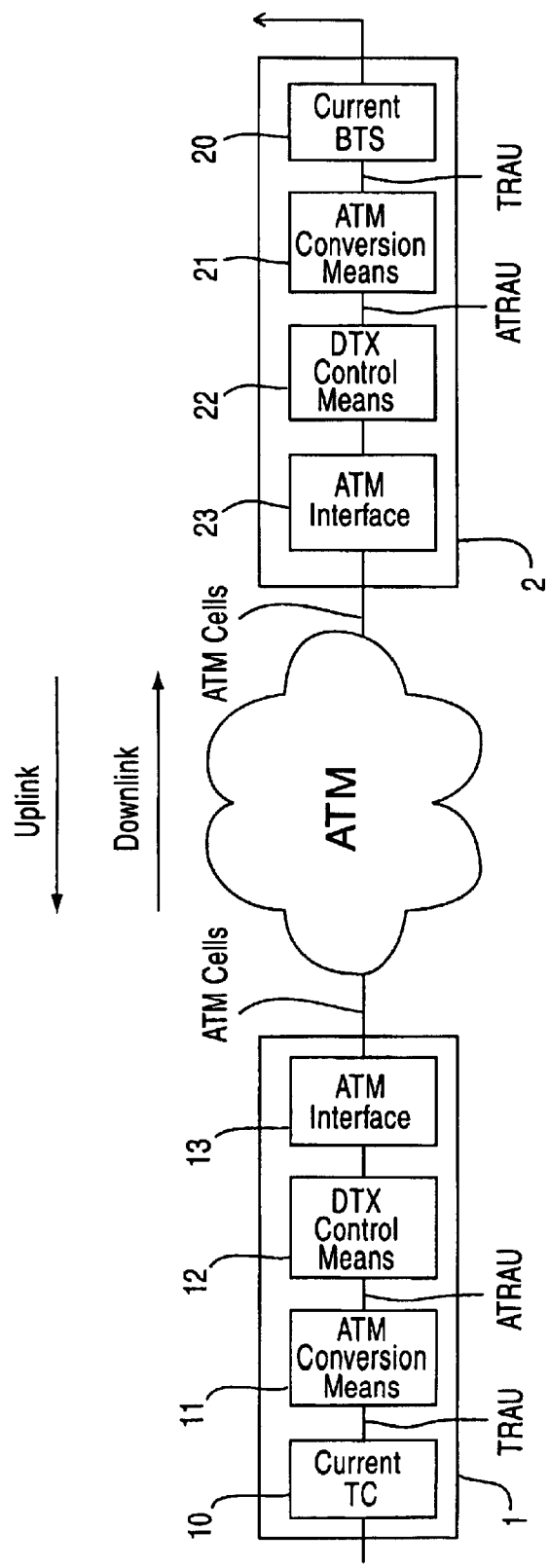
FIG. 1 shows a schematic block diagram of a TC and BTS connected via an ATM connection.

FIG. 1 shows a block diagram of a BSS comprising a TC 1 and a BTS 2 connected via an ATM connection. The TC 1 comprises a current or usual TC 10 already used in synchronuous connection systems and a conversion means 11 for performing a conversion between the TRAU frame used in the usual TC 10 and an asynchronous ATRAU frame (ATM-TRAU frame) used in an ATM cell of the ATM connection. The ATM-DTX functions are implemented in a DTX control means 12 which performs a conversion between the above described current DTX functions and the ATM-DTX functions. Finally, an ATM interface 13 is provided for connecting the TC 1 to the ATM connection.

The BTS 2 has a similar structure comprising a current or usual BTS 20, a conversion means 21 for performing conversion between the ATRAU and TRAU frame, a DTX control means 22 for implementing ATM-DTX functions and an ATM interface 23.

In FIG. 1, uplink and downlink directions are indicated by arrows.

In the following, the method according to the preferred embodiment of present invention will be described by means of state diagrams defining actions performed by the DTX control means 12 and 22, respectively. Therein, each state includes an action of reading the ATRAU frame received from the ATM connection, BTS 2 or TC 1 after the action mentioned in the diagram.

The transition from one state to another is triggered according to the indicated state of flag bits of a frame currently read. The symbol "&" defines a logical "and" which means that the state transition is triggered when both requirements are met. Each state period in the state diagrams preferably has the same duration and preferably equals to the ATM cell period.

Actually, the ATM cell rate which defines the total number of ATM cells per second depends on the TRAU frame rate. In case of a one-to-one mapping relationship, one TRAU frame is inserted into one ATM cell. Thus, the ATM cell period corresponds to the TRAU frame period, which is 20 ms (50 TRAU frames per second) during speech periods and 480 ms during speechless periods.

In the ATM specifications, a so-called ATM adaptation layer (AAL) is defined as a standard layer which allows multiple applications to have their data converted to and from the ATM cell. A protocol is used that translates higher layer services into the size and format of an ATM cell.

The above one-to-one relationship can be achieved, for example, by an ATM adaptation layer type 5 (AAL5) or without any adaptation layer ("AAL0") where ATM frames are just put to ATM cells.

However, the present invention can be implemented in an ATM adaptation layer type 2 (AAL2) as well. In this case, a so-called AAL2 minicell rate has to be considered rather than the ATM cell rate.

Thus, the ATM interfaces 13 and 23 in FIG. 1 preferably may be "AAL0", AAL2 or AAL5 interfaces.

The ATRAU frame may consist of 35 octets comprising a speech parameter information and the following flag information:

| FLAG | BIT | FRAME POSITION | MEANING |
| --- | --- | --- | --- |
| SID (LSB) | C14 | bit 4, octet 33 | silence descriptor flag |
| SID (MSB) | C13 | bit 3, octet 33 | (two bit information) |
| BFI | C12 | bit 2, octet 33 | bad frame indication flag |
| TAF | C15 | bit 5, octet 33 | time alignment flag |
| DTX | C17 | bit 6, octet 33 | discontinuous transmission flag |

The conversion means 11 of the TC 1 as well the conversion means 21 of the BTS 2 perform conversion such that a speech flag SP=1 in the TRAU frame results in a silence descriptor flag SID=00b=0d in the ATRAU frame and that a speech flag SP=0 (TRAU frame) results in a silence descriptor flag SID=10b=2d (ATRAU frame,), wherein "d" indicates a decimal number.

Throughout the following description, the flag states will be indicated by means of decimal numbers, wherein a corresponding indication will be omitted.

In the following, ATM-DTX functions in the downlink direction will be described.

Figure 2:
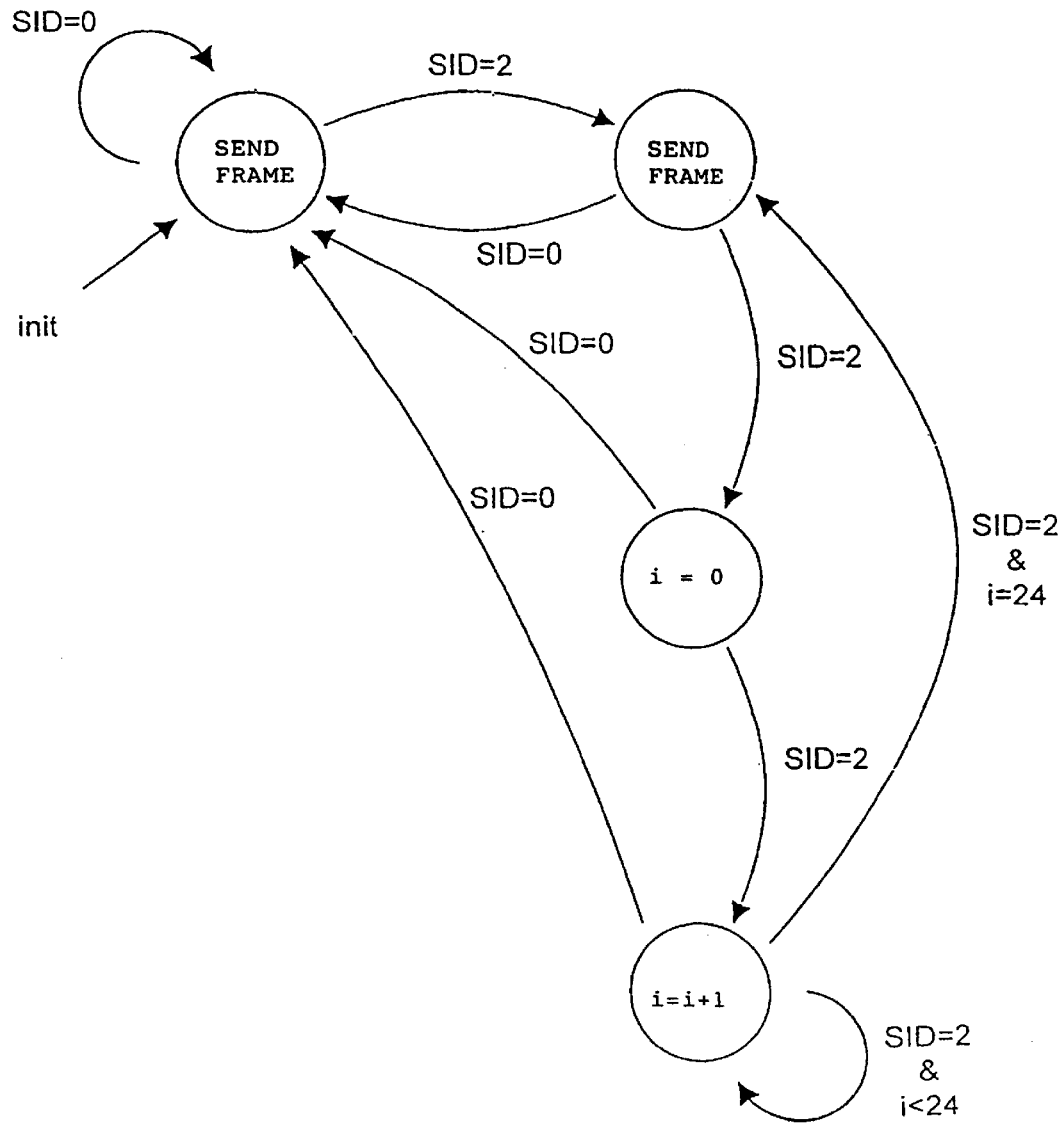
FIG. 2 shows a state diagram for downlink DTX transmitter functions of the TC according to the preferred embodiment.

FIG. 2 shows a state diagram for the ATM-DTX transmitter functions of the DTX control means 12 in the TC 1 in a downlink transmission from TC 1 to the ATM connection.

In the present case, BFI=0 is assumed and SID=1 should not occur, since a radio transmission of the frame was not yet performed.

According to FIG. 2, the ATRAU frame is transmitted to the ATM connection via the ATM interface 13 as long as an ATRAU frame containing speech information (SID=0) is transmitted.

In case of an ATRAU frame containing a comfort noise information (SID=2), only an ATM cell containing the first ATRAU frame is transmitted, wherein subsequent ATRAU frames with SID=2 lead to an initialization of a counter (i=0) and thereafter to a successive incrementation until the counter has counted to i=24. When i=24 has been reached, an ATM cell containing the corresponding ATRAU frame is transmitted to the ATM connection and the processing starts again as long as subsequent ATRAU frames with SID=2 are transmitted.

However, as soon as an ATRAU frame with a speech information (SID=0) is received, the DTX control means 12 is reset to its initial state where an ATM cell is transmitted for every ATRAU frame.

Accordingly, in speechless periods where SID=2, an ATM cell is only transmitted over the ATM connection every 24 state periods. In view of the fact-that the state period is 20 ms, the above processing leads to a transmission of an ATM cell with a comfort noise ATRAU frame every 480 ms, as required according to the DTX specifications. Thus, an additional synchronization is not required.

Figure 3:
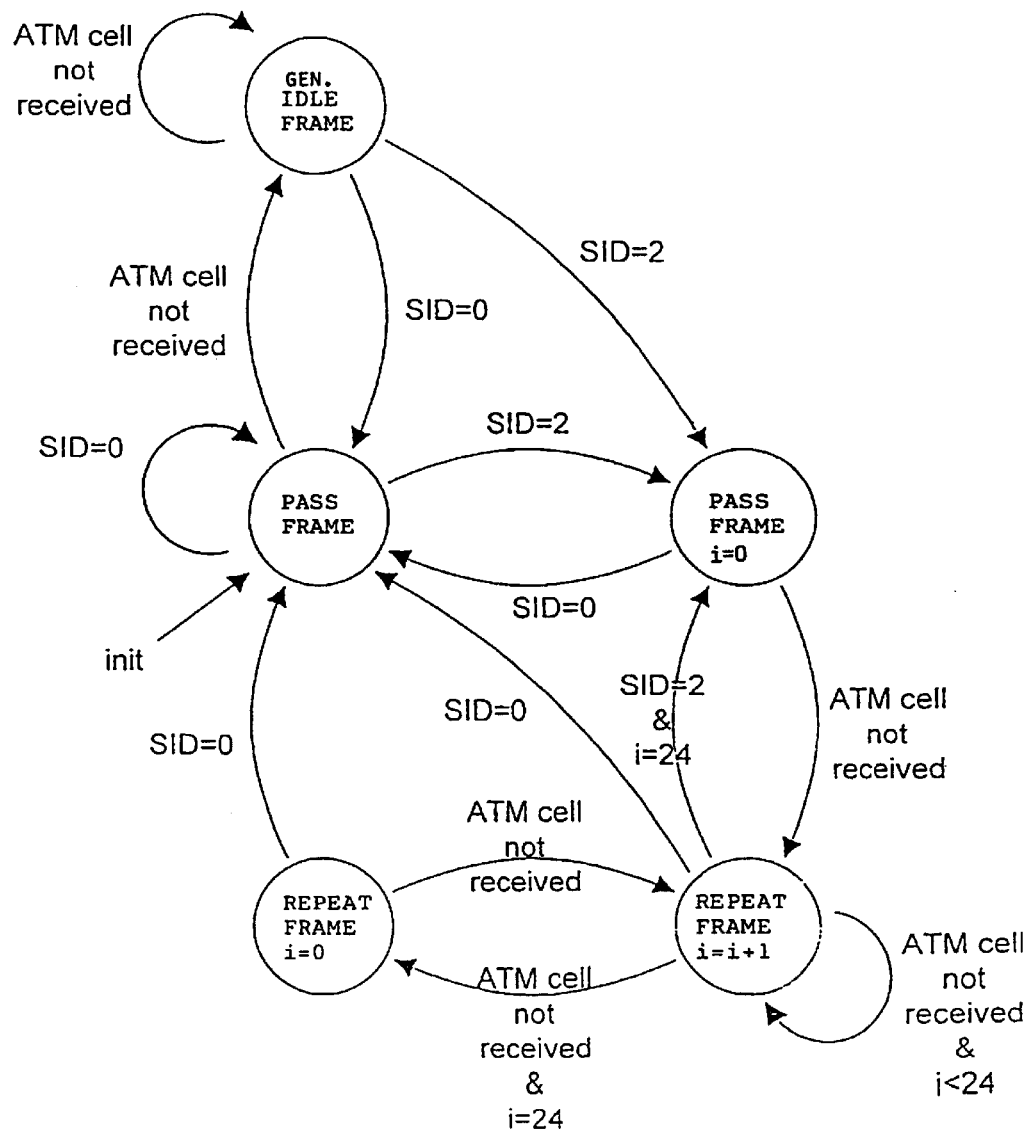
FIG. 3 shows a state diagram for downlink DTX receiver functions in the BTS according to the preferred embodiment of the present invention.

FIG. 3 shows a state diagram for the ATM-DTX receiver functions of the DTX control means 22 in the BTS 2 in a downlink transmission from the ATM connection to the BTS 2.

The state initially provided in the DTX control means 22 is to pass an ATRAU frame extracted from an ATM cell received by the ATM interface 23 to the usual BTS 20 via the conversion means 21. This initial state is maintained as long as ATM cells are received.

When no ATM cell is received, the DTX control means 22 is switched to another state where idle ATRAU frames are inserted until the next ATM cell is received.

Furthermore, a cell loss handling processing is provided, wherein a comfort noise information is repeated when no ATM cells are received. This can be achieved by repeating previous SID frames.

In the present case, a counter is additionally initialized (i=0) as soon as an ATM cell containing an ATRAU frame with SID=2 (comfort noise) is received. For every subsequent missing ATM cell, the counter is incremented and the last SID=2 ATRAU frame is repeated until a counting result "24" indicating a time period of 480 ms has been reached.

If no ATM cell is received when i=24, the last SID=2 ATRAU frame is again repeated and the counter is reset to zero (i=0). For every subsequent missing ATM cell, the above processing is repeated. If an ATM cell containing an ATRAU frame with SID=2 (comfort noise) is received when i=24, the new SID=2 frame is passed and the counter is reset to zero. In this case, the above processing is repeated for the new SID=2 frame.

During the above described cell loss handling procedure, any receipt of an ATM cell containing an ATRAU frame with SID=0 (speech information) leads to a reset of the DTX control means 22 to its initial state.

Accordingly, after the receipt of an ATM cell containing a comfort noise ATRAU frame with SID=2 and as long as no further ATM cell is received, this frame is repeatedly passed to the usual BTS 20 for 24 state periods of 20 ms, resulting in a DTX period of 480 ms.

When an ATM cell containing a new comfort noise ATRAU frame (SID=2) is received after the 24$^{th}$ frame, the new comfort noise ATRAU frame is repeatedly passed as long as no subsequent ATM cell is received and the above processing is repeated until an ATM cell containing a speech ATRAU frame (SID=0) is received.

By the above described processing, comfort noise frames with the required DTX time period of 480 ms are provided even if no ATM cells are received.

As an alternative, the repetition of previous SID frames could be performed in the BTS 2 or the MS. In this case, however, an idle speech frame handling performed in the BTS 2 or the MS has to be adapted correspondingly.

In the following, ATM-DTX functions in the uplink direction are described.

Figure 4:
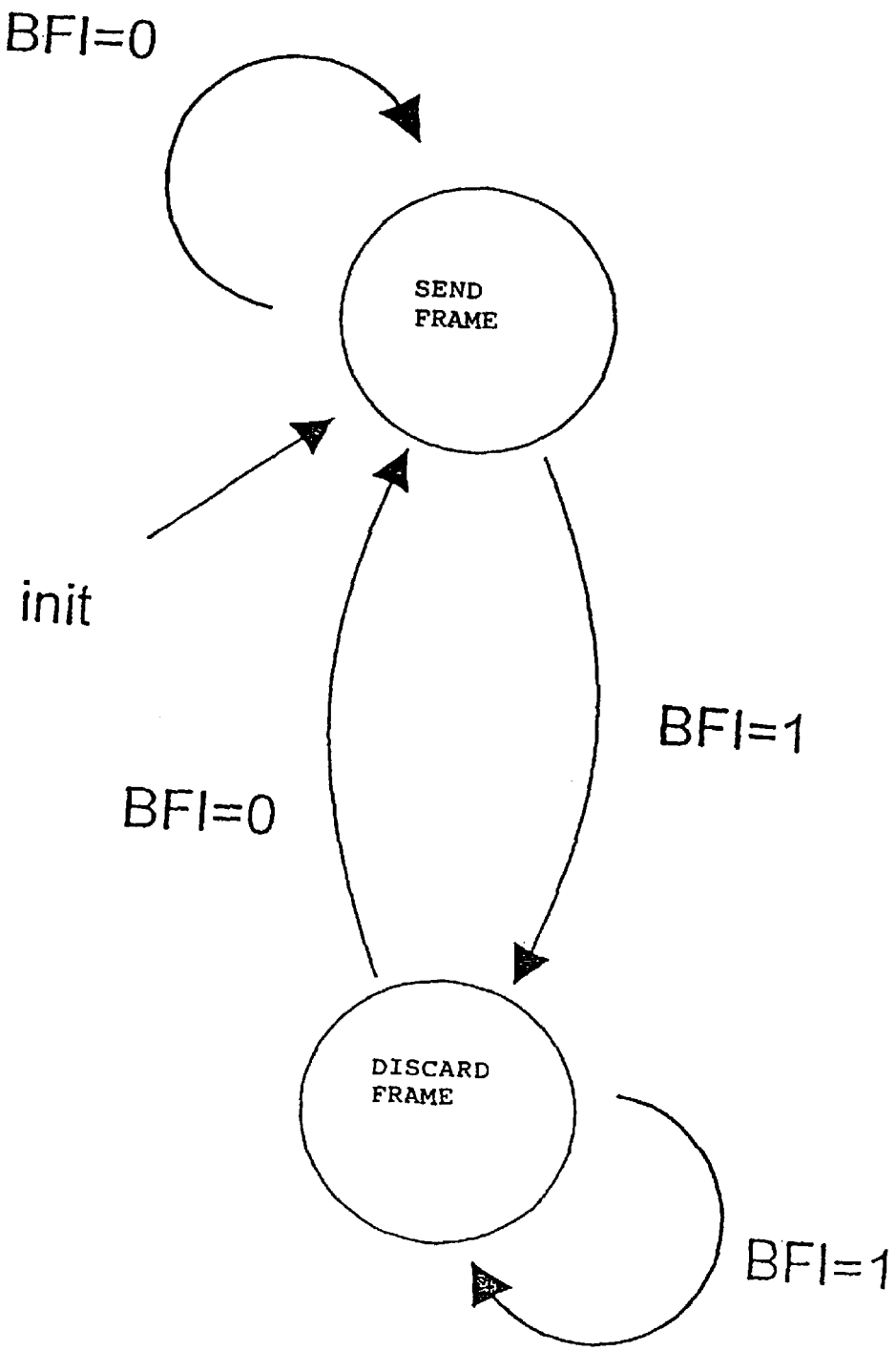
FIG. 4 shows a state diagram for uplink DTX transmitter functions in the BTS according to the preferred embodiment of the present invention.

FIG. 4 shows a state diagram for DTX transmitter functions of the DTX control means 22 in the BTS 2 in an uplink transmission from the BTS 2 to the TC 1.

In the initial state, an ATM cell containing an ATRAU frame corresponding to a TRAU frame received by the usual BTS 20 and converted by the conversion means 21 is transmitted to the ATM connection as long as the BFI flag of the current ATRAU frame is zero, i.e. the frame information has not been destroyed during radio transmission.

However, BFI=1 indicates that the frame is an unusable speech frame or an invalid SID frame which does not have to be transmitted over the ATM connection. Thus, ATRAU frames with BFI=1 are discarded and no ATM cells are transmitted until a new ATRAU frame with BFI=0 is received and the DTX control means 22 is reset to its initial state.

Accordingly, in the ATM-DTX uplink transmitter function, no ATM cell is transmitted as long as ATRAU frames with BFI=1 are received.

Figure 5:
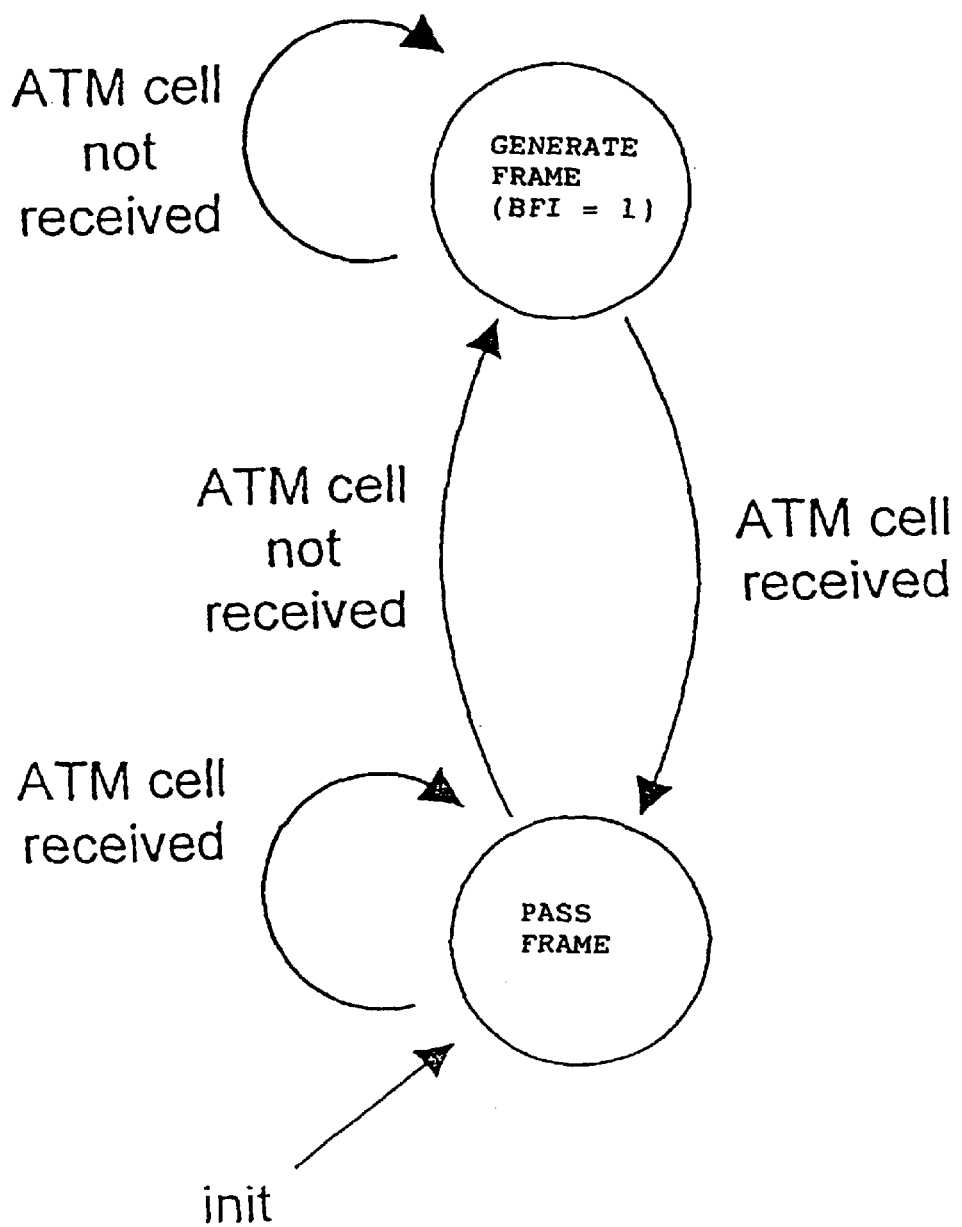
FIG. 5 shows another state diagram for uplink DTX receiver functions in the TC according to the preferred embodiment of the present invention.

FIG. 5 shows a state diagram for the ATM-DTX receiver functions of the DTX control means 12 in the TC 1 in an uplink transmission from the ATM connection to the TC 1.

Initially, the DTX control means 12 is set to a state where an ATRAU frame of an ATM cell received from the ATM interface 13 is passed to the usual TC 10 via the conversion means 11. This initial state is maintained as long as ATM cells are received.

In case no ATM cell is received, the DTX control means 12 is switched to a another state where an ATRAU frame with a BFI flag set to "1" is generated until the next ATM cell is received and the DTX control means 12 is reset into its initial state.

Figure 6:
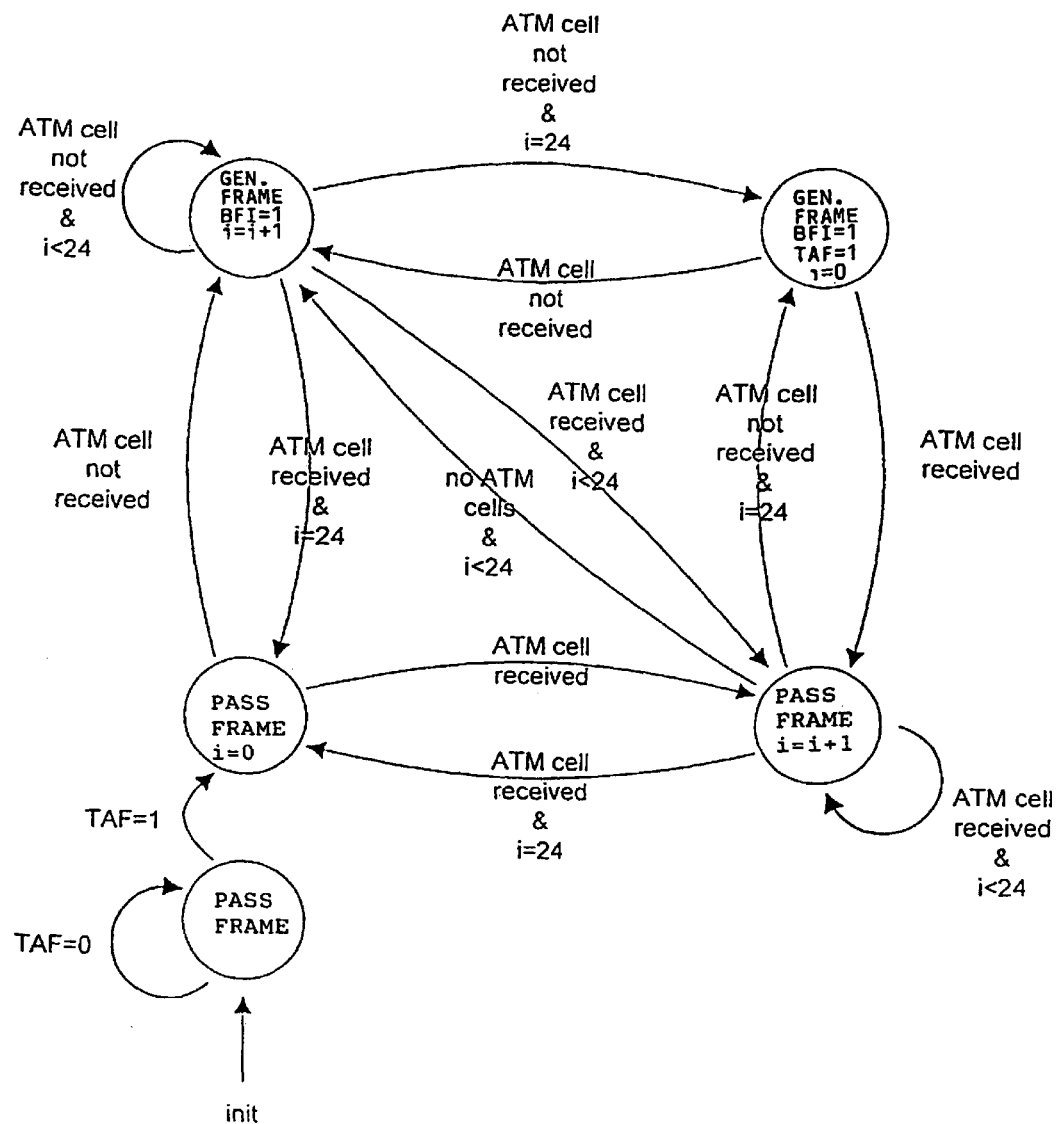
FIG. 6 shows a state diagram for uplink DTX receiver functions in the TC according to the preferred embodiment of the present invention.

FIG. 6 shows another state diagram for the ATM-DTX receiver functions of the DTX control means 12 in the TC 1 in an uplink transmission from the ATM connection to the TC 1. In this case, the usual TC 10 does not have to handle missing TAF=1 frames, since the corresponding processing is performed by the DTX control means 12.

In the initial state, the DTX control means passes ATRAU frames with TAF=0 of received ATM cells to the usual TC 10 until an ATM cell containing an ATRAU frame with TAF=1 indicating a timing alignment is received and the state of the DTX control means 12 is changed.

In the new state, the TAF=1 frame is also passed to the usual TC 10 and, additionally, a counter is now reset to zero. With any subsequently received ATM cell, the counter is incremented and the contained ATRAU frame is passed to the usual TC 10 until a count value "24" has been reached. When an ATM cell is received and i=24, the corresponding ATRAU frame is passed to the usual TC 10 and the counter is reset to zero.

By the above processing, the counter is synchronized to the TAF=1 frames. Thus, only the state of the counter and the presence or absence of ATM cells needs to be considered in the following processing.

When no ATM cells are received after the initial synchronization of the counter, ATRAU frames with BFI=1 indicating a bad frame are generated and the counter is incremented until the count value has reached "24".

When ATM cells are received before the counter has reached i=24, the corresponding ATRAU frames are passed to the usual TC 10 while the counter is still incremented with any received ATM cell.

In any case, when i=24 and no ATM cell has been received, an ATRAU frame with TAF=1 and BFI=1 is generated and the counter is reset to zero. Thereafter, the above processing is repeated.

Accordingly, in the ATM-DTX uplink receiver function, ATRAU frames with BFI=1 are generated when no ATM cells are received. Furthermore, a counter may be synchronized to a TAF=1 frame and an ATRAU frame with TAF=1 and BFI=1 may be generated any time the counter reaches the value of "24" and no ATM cell has been received. Thereby, the initially described known processings for bad TRAU frames can be performed in the usual TC 10.

It is obvious that a similar processing can be performed in half rate speech traffic channels to thereby implement discontinuous transmission over ATM connections using current GSM network elements.

Moreover, direct switching from the BTS 2 to another BTS can be performed without using the TC 1 if the ATM-DTX functions of the DTX control means 12 of the TC 1 are provided in the DTX control means 22 of the BTS 2.

In summary, a method for performing a discontinuous transmission in an asynchronous transfer mode is described, wherein a downlink transmission of an ATM cell is performed each time a predetermined number of signal frames indicating a speechless period have been supplied, and wherein an uplink transmission of an ATM cell is only performed when a signal frame indicating a useful information has been supplied. In the downlink transmission, an idle frame can be generated at the receiving end, when no ATM cell is received. In the uplink transmission, a signal frame indicating a useless information can be generated, when no ATM cell is received. Thereby, only those signal frames required at the receiving end are transmitted. Moreover, known transmission functions and elements of a synchronous transmission system can be used at the respective ends of transmission.

It should be understood that the above description and accompanying figures are only intended to illustrate the present invention. Thus, the method and apparatus according to the invention may also be used in systems other than the described GSM system. The preferred embodiment of the invention may vary within the scope of the attached claims.

What is claimed is:

1. A method for performing discontinuous transmission in an asynchronous transfer mode ATM between a transcoder and a base transceiver station, comprising the steps of:
   performing a transmission of an ATM cell in a downlink direction each time a predetermined time period has expired, when signal frames indicating a speechless period are supplied;
   determining said predetermined time period by counting a predetermined number of said signal frames indicating a speechless period;
   performing an uplink transmission of an ATM cell only when a signal frame indicating a useful information has been supplied;
   wherein frames containing speech information are transmitted to an ATM connection via an ATM interface,
   whereas in case of frames containing a comfort noise information, only an ATM cell containing the first frame containing the comfort noise information is transmitted, wherein subsequent frames with comfort noise information lead to an initialization of a first counter and thereafter to a successive incrementation thereof until the first counter has counted to a defined value, wherein, when the defined value has been reached, an ATM cell containing the corresponding frame is transmitted to the ATM connection and the processing starts again as long as subsequent frames with comfort noise information are transmitted,
   wherein, in the uplink direction, when an ATM cell containing a frame indicating a timing alignment is received, a second counter is reset, and, with any subsequently received ATM cell, the second counter is incremented and the contained frame is passed to the transcoder until a predetermined count value has been reached,
   when no ATM cells are received after the initial synchronization of the second counter, frames with information indicating a bad frame are generated and the second counter is incremented until the count value reaches the predetermined value, and
   when ATM cells are received before the second counter has reached the predetermined value, the corresponding frames are passed to the transcoder while the second counter is still incremented with any received ATM cell.

2. A method according to claim 1, wherein an idle speech frame is generated, when no ATM cell has been received at a receiving end of the downlink transmission.

3. A method according to claim 2, wherein the last signal frame received at the receiving end of the downlink transmission and indicating a speechless period is repeated, when the number of ATM cells not received at the receiving end of the downlink transmission corresponds to said predetermined number of signal frames after which an ATM cell is transmitted.

4. A method according to claim 3, wherein the first counter is initialized each time an ATM cell containing a signal frame indicating a speechless period has been received, and wherein said first counter is incremented each time no ATM cell has been received.

5. A method according to claim 1, wherein a frame indicating a useless information is generated, when no ATM cell has been received at a receiving end of the uplink transmission.

6. A method according to claim 5, wherein a time alignment flag (TAF) is set at the receiving end of the uplink transmission, when the number of ATM cells received or missed since the last setting of the time alignment flag corresponds to said predetermined number of signal frames.

7. A method according to claim 6, wherein the second counter is initialized when an ATM cell containing a set time alignment flag is received at the receiving end of the uplink transmission, and wherein said counter is incremented each time an ATM cell is received or missed at the receiving end of the uplink transmission.

8. A method according to claim 1, wherein said predetermined number is determined on the basis of a discontinuous transmission period during said speechless period.

9. A method according to claim 1, wherein said uplink and downlink transmission is performed in a GSM system between the transcoder and the base transceiver station.

10. A method according to claim 9, wherein a bad frame indicator flag (BFI), of a GSM speech frame is used to indicate a useless information in said uplink transmission.

11. A method according to claim 8 or 9, wherein a silence predictor flag (SID), of a GSM speech frame is set on the basis of a speech flag, (SP), of said GSM speech frame, and wherein said silence predictor flag is used to indicate said speechless period in said downlink transmission.

* * * * *